(12) United States Patent
Wu et al.

(10) Patent No.: US 8,723,460 B2
(45) Date of Patent: May 13, 2014

(54) METHOD AND SYSTEM FOR CONTROLLING AN ELECTRIC MOTOR WITH COMPENSATION FOR TIME DELAY IN POSITION DETERMINATION

(75) Inventors: Long Wu, Fargo, ND (US); Robert Shaw, Moorhead, MN (US); Srujan Kusumba, Fargo, ND (US)

(73) Assignee: Deere & Company, Moline, IL (US)

( * ) Notice: Subject to any disclaimer, the term of this patent is extended or adjusted under 35 U.S.C. 154(b) by 290 days.

(21) Appl. No.: 13/169,533

(22) Filed: Jun. 27, 2011

(65) Prior Publication Data

US 2012/0212162 A1    Aug. 23, 2012

Related U.S. Application Data (60) Provisional application No. 61/445,640, filed on Feb. 23, 2011.

(51) Int. Cl.
    *H02P 21/00*    (2006.01)
(52) U.S. Cl.
    USPC ............. 318/400.02; 318/798; 318/690
(58) Field of Classification Search
    USPC ............. 318/400.02, 798, 690, 700, 727, 318/400.28, 400.08, 443, 434, 811
    See application file for complete search history.

(56) References Cited

U.S. PATENT DOCUMENTS

| | | | |
|---|---|---|---|
| 3,839,628 A | 10/1974 | Higgins et al. | |
| 4,023,083 A | 5/1977 | Plunkett | |
| 4,047,083 A | 9/1977 | Plunkett | |
| 4,291,368 A | 9/1981 | Yarema et al. | |
| 4,814,677 A | 3/1989 | Plunkett | |
| 4,849,871 A | 7/1989 | Wallingford | |
| 5,386,186 A | 1/1995 | Gritter | |
| 5,428,283 A | 6/1995 | Kalman et al. | |
| 5,486,748 A | 1/1996 | Konrad et al. | |
| 5,914,582 A | 6/1999 | Takamoto et al. | |
| 6,275,000 B1 | 8/2001 | Nishimura | |
| 6,301,136 B1 | 10/2001 | Huggett et al. | |
| 7,045,988 B2 | 5/2006 | Ha et al. | |
| 7,157,878 B2 | 1/2007 | Collier-Hallman | |
| 7,294,988 B2 | 11/2007 | Ajima et al. | |
| 7,679,309 B2 | 3/2010 | Schulz et al. | |

(Continued)

OTHER PUBLICATIONS

International Search Report and the Written Opinion of the International Searching Authority, dated Jun. 29, 2012 (17 pages).

(Continued)

*Primary Examiner* — Karen Masih (57) ABSTRACT

A sensor detects position data for a rotor of the motor at a first time. A data processor receives the detected position data associated with a first time delay. A sensing circuit senses an analog current at the motor during a second time delay. An analog-to-digital converter converts the analog current to a digital current data during a third time delay. The fourth time delay is detected between actual current reading instant and position reading instant in a data processor. The digital phase current data is transformed into measured direct and quadrature axes control current data based on synchronization or temporal alignment of the position data with the actual measured analog phase current at the starting time by compensating the position data by a sum of the second time delay, the third time delay and the fourth time delay, where the first time delay is subtracted from the sum.

22 Claims, 7 Drawing Sheets

(56) References Cited

U.S. PATENT DOCUMENTS

| | | | |
|---|---|---|---|
| 7,733,044 | B2 | 6/2010 | Nakamura et al. |
| 7,880,428 | B2 | 2/2011 | Kamikisaki |
| 2006/0247829 | A1 | 11/2006 | Sato |
| 2009/0160387 | A1 | 6/2009 | Terorde |
| 2009/0310489 | A1 | 12/2009 | Bennett |
| 2010/0165674 | A1 | 7/2010 | Dai et al. |
| 2010/0188033 | A1 | 7/2010 | Daboussi et al. |
| 2012/0217909 | A1* | 8/2012 | Wu et al. ............ 318/400.02 |

OTHER PUBLICATIONS

PM Sinusoidal Motor Vector Control with Quadrature Encoder. Designer Reference Manual [online]. Freescale Semiconductor, Inc. 2008. [Retrieved on Jun. 5, 2012]. Retrieved from internet <URL:http://cache.freescale.com/files/microcontrollers/doc/ref_manual/DRM105.pdf> entire document.

Goslin. A Guide to Usng Field Programmable Gate Arrays (FPGAs) for Application-Specific Digital Signal Processing Performance. Manual [online]. Xilink, Inc. 1995. [Retrieved on Jun. 5, 2012]. Retrieved from internet:<URL:http://direct.xilinx.com/appnotes/dspguide.pdf> entire document.

Elbuluk, Malik E. et al. Speed Sensoriess Induction Motor Drives for Electrical Actuators: Schemes, Trends and Tradeoffs, NASA Technical Memorandum 107466. Retrieved from the Internet:<URL:http://www.esat.kuleuven.be/electa/publications/fulltexts/pub_479.pdf>.

Van Haute, S. et al. Design and Control of a Permanent Magnet Synchronous Motor Drive for a Hybrid Electric Vehicle, Retrieved from the Internet:<URL:http://www.esat.kuleuven.be/electa/publications/fulltexts/pub_444.pdf>.

US 7,595,604, 09/2009, Tomigashi (withdrawn)

* cited by examiner

METHOD AND SYSTEM FOR CONTROLLING AN ELECTRIC MOTOR WITH COMPENSATION FOR TIME DELAY IN POSITION DETERMINATION

This document claims priority based on U.S. provisional application Ser. No. 61/445,640, filed on 23 Feb. 2011 and entitled METHOD AND SYSTEM FOR CONTROLLING AN ELECTRIC MOTOR WITH COMPENSATION FOR TIME DELAY IN POSITION DETERMINATION, under 35 U.S.C. 119(e).

FIELD OF THE INVENTION

This invention relates to a method and system for controlling an electric motor with compensation for time delay in position determination.

BACKGROUND OF THE INVENTION

An electric motor may feature a rotor with permanent magnets and a stator, such as an interior permanent magnet (IPM) motor or an IPM synchronous motor. In accordance with certain prior art, the position data may be delayed by electronic data processing or measurement circuitry, which produces an error between the actual measured position and the position intended to be used with phase currents for Park transformation. In turn, the control signals generated by the inverter may not be matched or synchronized in time with the position of the rotor, which results in inefficient or inaccurate control of the motor. Thus, there is a need for a method and system for controlling an electric motor with compensation for time delay in determined rotor position.

SUMMARY OF THE INVENTION

In accordance with one embodiment, a method and system is presented for controlling an electric motor, or determining a position of a rotor or motor shaft, with compensation for time delay. A sensor detects position data for a rotor of the motor at a first time. A data processor receives the detected position data associated with a first time delay. A sensing circuit senses analog current (e.g., an analog phase current) at the motor by operating during a second time delay. An analog-to-digital converter converts the analog current to a digital current data (e.g., digital phase current data) during a third time delay. The fourth time delay is detected between actual current reading instant and position reading instant in a data processor. The digital current data is transformed into measured direct and quadrature axes control current data based on synchronization or temporal alignment of the position data with the actual measured analog current at the starting time by compensating the position data by a sum of the second time delay, the third time delay and the fourth time delay, where the first time delay is subtracted from the sum.

DESCRIPTION OF THE PREFERRED EMBODIMENT

Figure 1:
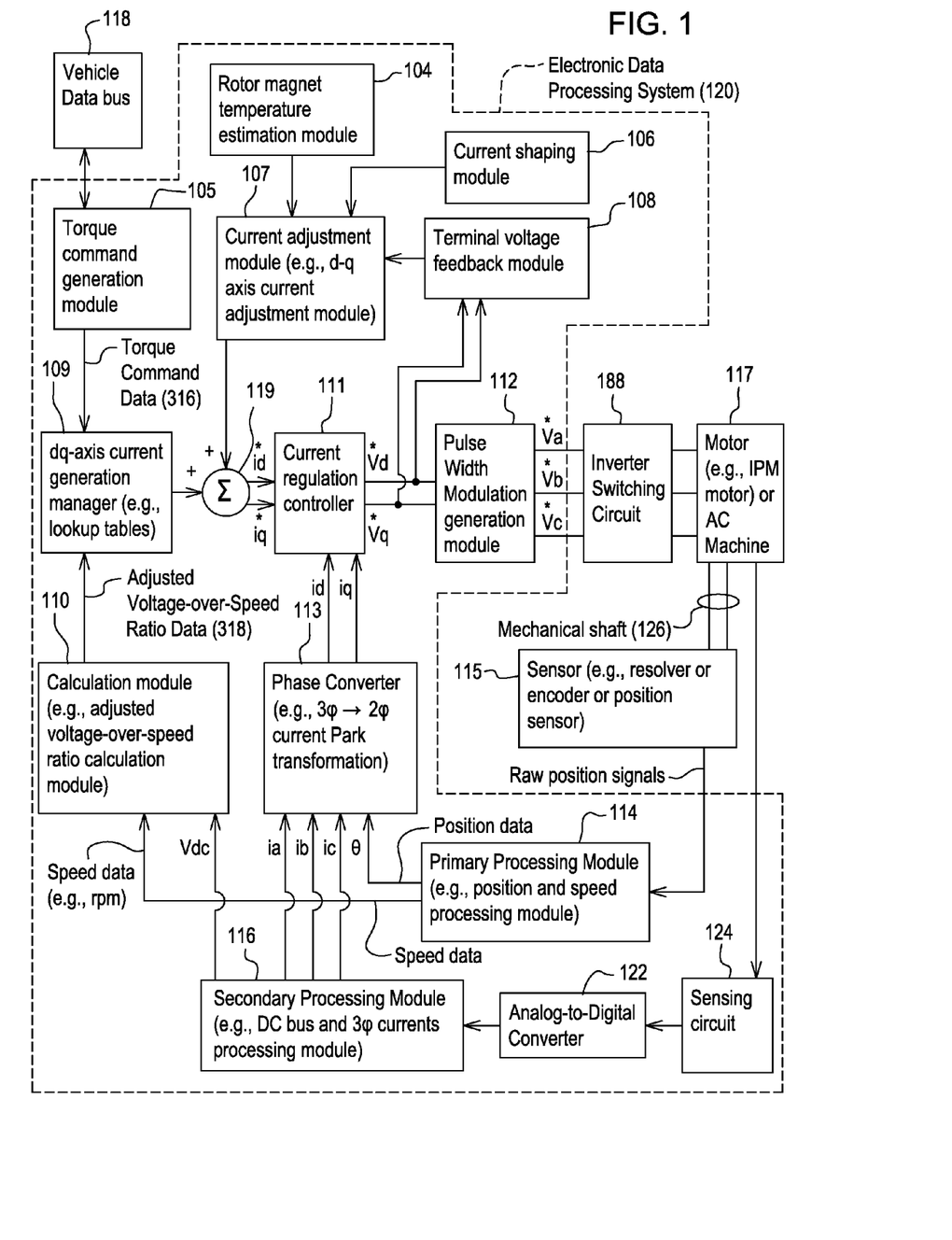
FIG. 1 is a block diagram of one embodiment of a system for controlling an electrical motor with time compensation for position sensing.

In accordance with one embodiment, FIG. 1 discloses system for controlling a motor 117 (e.g., an interior permanent magnet (IPM) motor) or another alternating current machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1 and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data ($i_d$*) and quadrature axis current data ($i_q$*)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d$* and $i_q$*) and actual d-q axis currents (e.g., $i_d$ and $i_q$) and outputs corresponding d-q axis voltage commands (e.g., $v_d$* and $v_q$* commands) for input to the PWM generation module 112.

In one embodiment, the PWM generation module 112 converts the direct axis current and quadrature axis voltage data from two phase data representations into three phase representations (e.g., three phase voltage representations, such as $v_a^*$, $v_b^*$ and $v_c^*$) for control of the motor 117, for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a pulse-width modulated signal or other alternating current signal for control of the motor. In one embodiment, the inverter 188 is powered by a direct current (DC) voltage bus.

The motor 117 is associated with a sensor 115 (e.g., a resolver, encoder, speed sensor, or another position sensor or sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The rotor magnet temperature module 104 estimates or determines the temperature of the rotor permanent magnet or magnets. In one embodiment, the rotor magnet temperature estimation module 104 may estimate the temperature of the rotor magnets from internal control variables calculation, one or more sensors located on the stator, in thermal communication with the stator, or secured to the housing of the motor 117.

In one alternate embodiment, the rotor magnet temperature estimation module 104 may be replaced by or may estimate the temperature of the rotor magnets from one or more sensors located on the stator, in thermal communication with the stator, or secured to the housing of the motor 117.

In another alternative embodiment, the rotor magnet temperature estimation module 104 may be replaced with a temperature detector (e.g., a thermistor and wireless transmitter) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104 and the current shaping module 106.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature or an estimated change in magnetic field strength of the rotor magnets with respect to a characterized rotor temperature or magnetic field strength at a known ambient temperature under known operational conditions, for example. The current adjustment module 107 may provide an aggregate current adjustment that considers at least one of the preliminary adjustment and one of the secondary adjustment.

The sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the motor shaft 126. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the sensor 115 comprises a resolver with a first winding and a second winding, where the first winding is fed with an alternating current, where the voltage induced in the second winding varies with the frequency of rotation of the rotor.

Figure 2:
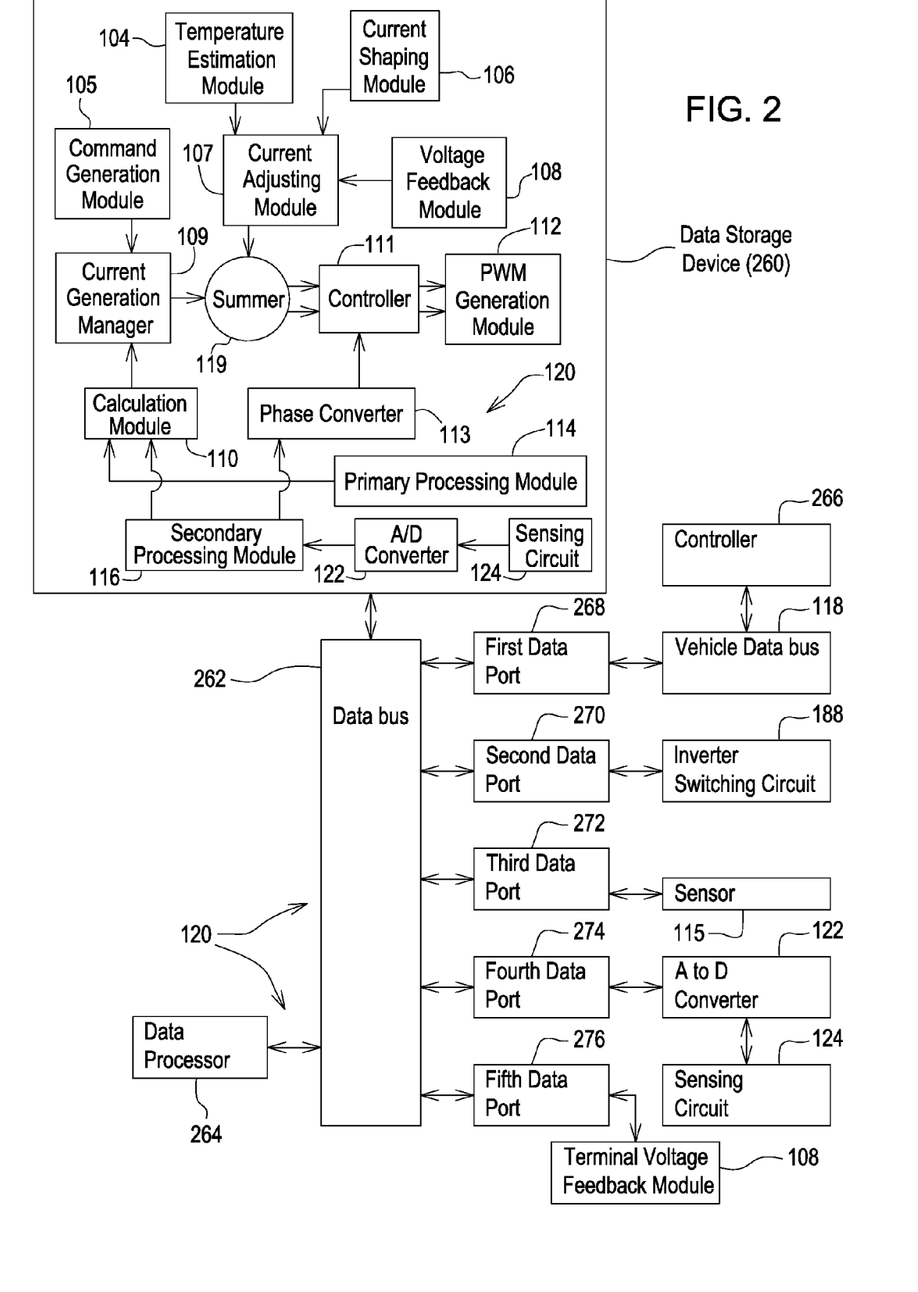
FIG. 2 is a block diagram of an electronic data processing system consistent with FIG. 1.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise one or more of the following electronic components: an electronic data processor, a microprocessor, a microcontroller, a programmable logic array, a field programmable gate array (FPGA), a logic circuit, an arithmetic logic unit, an application specific integrated circuit, a digital signal processor (DSP), a proportional-integral-derivative (PID) controller, or another data processing device. The above electronic components may be interconnected via one or more data buses, parallel data buses, serial data buses, or any combination of parallel and serial data buses, for example.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

Figure 3:
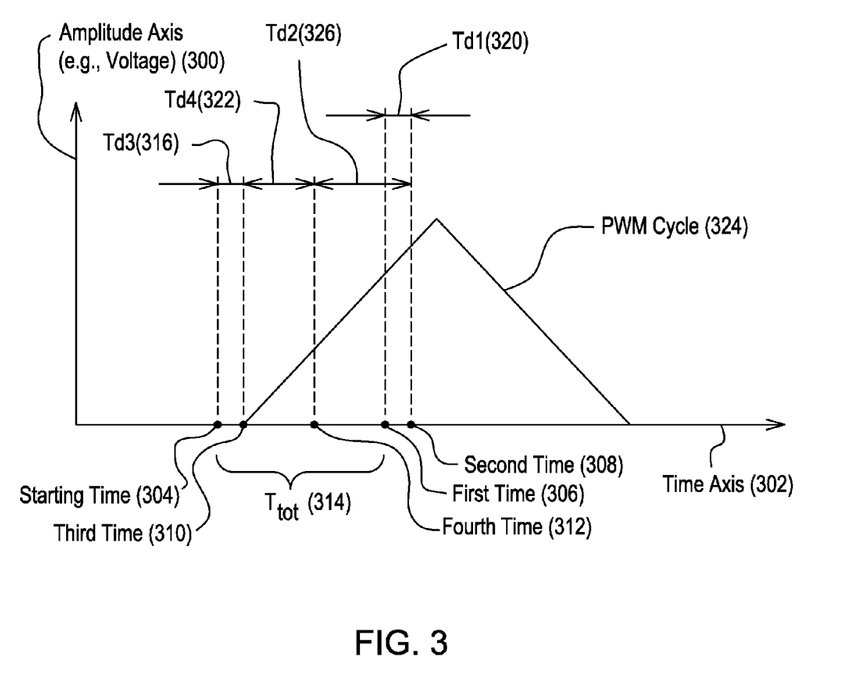
FIG. 3 is a graph of time delays associated with a pulse-width-modulation cycle of the electronic data processing system for controlling an electrical motor.

FIG. 3 is a graph of time delays associated with a pulse-width-modulation cycle or another pulse cycle (e.g., clock pulse) of the electronic data processing system for controlling an electrical motor. In FIG. 3, the horizontal axis is the time axis, whereas the vertical axis is the amplitude axis. Although FIG. 3 shows a signal pulse of a pulse width modulation cycle, the signal pulse may be for a clock signal or another type of signal. In one embodiment, vertical axis represents the pulse width modulation time base counter in the data processing system 120 because the amplitude or voltage of the pulse has a known slope versus time or profile. The data processor 264 may read the counter value to get a corresponding time stamp for each instant to determine any time delay, or beginning time, termination time, or intermediate time.

FIG. 3 illustrates the first time delay, the second time delay, the third time delay and the fourth time delay with respect to time points on the time axis. The time points comprise the starting time, the first time the second time, the second time, the third time and the fourth time.

Alternatively, the time delays may be referred to by the following mathematical variables, where $Td1$ is the first time delay, $Td2$ is the fourth time delay; $Td3$ is the second time delay; Td4 is the third time delay; and Ttot or Ttotal is the determined in accordance with the following equation:

$$Ttotal = Td3 + Td4 + Td2 - Td1.$$

Figure 4:
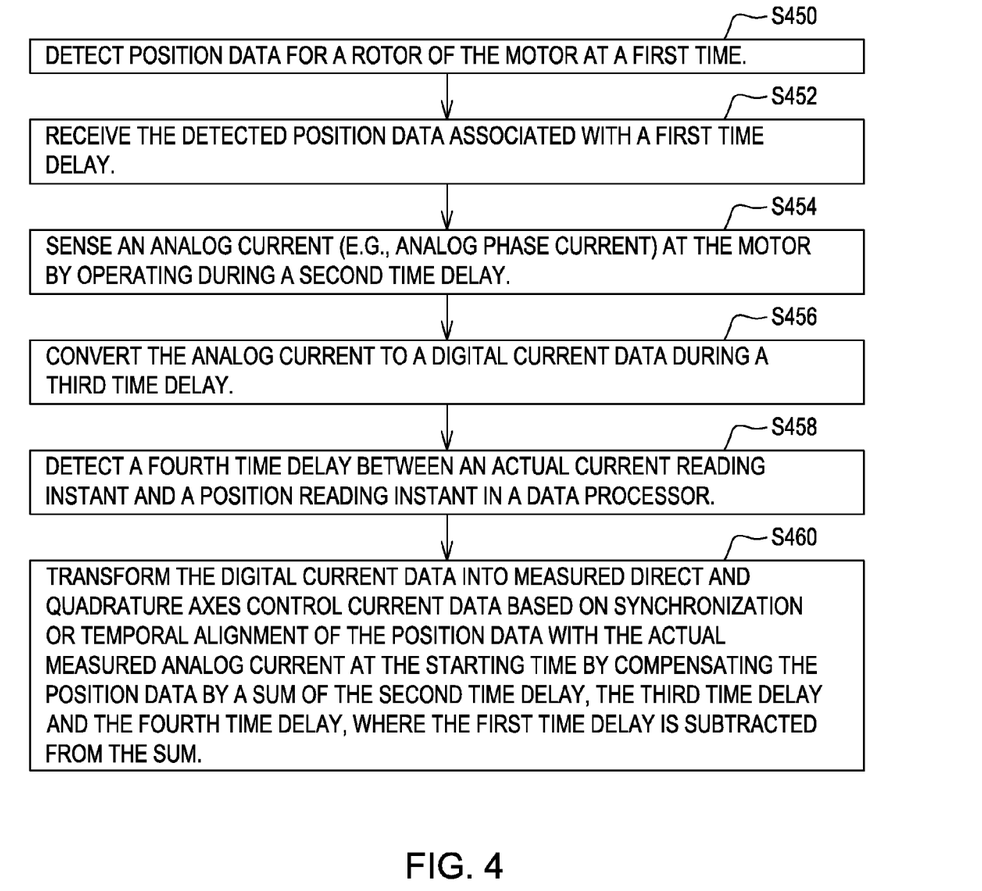
FIG. 4 is a flow chart of a first embodiment of a method for controlling an electrical motor with time compensation for position sensing.

FIG. 4 discloses a first embodiment of a method for controlling an electric motor (e.g., motor 117), or determining a position of a rotor or motor shaft 126, with compensation for time delay. The method of FIG. 4 begins in step S450.

In step S450, a sensor 115 detects position data for a rotor of the motor 117 at a first time.

In step S452, a data processor 264 receives the detected position data associated with a first time delay. The first time delay (e.g., Td1) comprises the time period between a first time and a second time, where the first time is associated with detection of the raw position by the sensor 115 and where the second time is associated with the detection of the raw position at the data processor (264 or 664) or digital signal processor (606) (e.g., after transmission via one or more data paths or via one or more data buses). In one embodiment, the detected position data is received at a data processor 264 is communicated via a first data bus (e.g., 602 in FIG. 6) from the sensor 115 to a field programmable gate array (FPGA) and a second data bus (e.g., 608 in FIG. 6) from the field programmable gate array to a digital signal processor (DSP), where the first data bus comprises a serial data bus and the second data bus comprises a parallel bus. In one illustrative example, the first time delay comprises a time period associated with transmission of a sensor signal from the sensor 115 and receipt of the sensor signal at the primary processing module 114 or data processor 264.

In step S454, a sensing circuit 124 senses an analog current (e.g., analog phase current or analog three phase currents) at the motor 117 by operation of the sensing circuit 124 during a second time delay. The second time delay (Td3) comprises the time period of hardware signal processing delay for a signal representative of the sensed position data to traverse the sensing circuit 124. The second time delay begins with the actual sensing of three phase analog current at the sensing circuit 124 and terminates with providing of the three phase analog current to the digital-to-analog converter 122. In one illustrative example, the second time delay comprises a time period when the sensing circuit 124 senses an analog phase current (e.g., analog three phase current) at the motor 117 via the sensor signal.

In one embodiment, the second time delay (e.g., Td3) in the hardware sensing stage is determined by the following equation.

$$T_{d3} = \frac{\Phi_{tot}(f_e)}{360°} \cdot \frac{1}{f_e},$$

where $f_e$ is the electrical frequency corresponding to a specific motor speed and $\phi_{tot}$ is the total phase delay or time delay caused by the sensing circuit 124.

In step S456, an analog-to-digital converter 122 converts and stores the analog current (e.g., analog three phase current) to a digital current data (e.g., digital three phase current data) during a third time delay. For example, in the analog-to-digital converter 122, the storage may occur in sample-and-hold registers, in analog-to-digital converter peripheral registers, or both, where delay is associated with storage in the registers, or transfer of data between the registers. The analog current comprises analog three phase current and wherein digital current data comprises digital three phase current. The third time delay (e.g., Td4) comprises the time period associated with the analog-to-digital conversion process in the analog to digital converter 122. The third time delay includes analog-to-digital sampling and hold delay. At the termination of the third time delay, the digital three phase current data is provided to the data processor (264 or 664) or digital signal processor (606).

In step S458, the fourth time delay is detected between actual current reading instant (e.g., digital three phase current reading) and corresponding position reading instant in a data processor 264. For example, a secondary processing module 116 or the data processor 264 detects the time difference between actual current reading instant and position reading instant in a data processor 264 (e.g., digital signal processor (DSP)) as a fourth time delay (e.g., Td2) between the fourth time and first time. The fourth time delay represents a time between the first time and the fourth time. The fourth time delay (Td2) comprises the difference between a current reading instant of the digital three phase current and the position reading instant in the data processor (264 or 664). In one illustrative example, the fourth time delay comprises a primary data processing time period (or through-put time) for position reading and determination in the data processor 264 (e.g., primary processing module 114), and a secondary data processing time period (or through-put time) for current phase reading and determination in the data processor 264 (e.g., secondary processing module 116).

In step S460, the digital current data is transformed into measured direct and quadrature axes control current data based on synchronization or temporal alignment of the position data with the actual measured analog current (e.g., three phase current) at the starting time by compensating the position data by a sum of the second time delay, the third time delay and the fourth time delay, where the first time delay is subtracted from the sum. For example, the data processor 264 provides respective position data of the rotor from the primary processing module 114 that is synchronized with the corresponding current phase data (e.g., $i_a$, $i_b$, and $i_c$) from the secondary processing module 116 for temporally aligned input to the phase converter 113 (e.g., for Park transformation) because of the compensation (e.g., the offset provided by the first time delay, subtracted from the above sum).

Step S460 may be carried out in accordance with various techniques that may be applied alternately or cumulatively. Under a first technique, the phase converter 113 or data processor (e.g., 264 or 664) transforms or converts three-phase current readings into actual direct and quadrature-axes current data by establishing an adjusted direct-quadrature axes for the motor by the data processor 264, where the adjustment relates to the applying the temporal alignment to a raw direct-quadrature axes determined by the raw position sensor reading. Under a second technique, the phase converter 113 or the data processor (e.g., 264 or 664) transforms or converts three-phase current readings into actual dq-axis currents by adjusting the transformation angle or rotor position angle, defined from a phase-A magnetic axis to the positive direct axis. Under a third technique, the phase converter 112 or the data processor (e.g., 264 or 664) transforms by converting three-phase detected currents readings into actual direct and quadrature axes current data using actual position data of the rotor, which may be advanced in time from the detected position data in the data processor 264 at the second time due to serial and parallel bus communication (e.g., the first data bus 602 and the second data bus 608 of FIG. 6, respectively).

In an alternative embodiment, after step S460, the data processor (264 or 664) may apply an additional compensation to the raw detected rotor position data reading in the data processor 264 consistent with the following equation to adjust the hardware sensing stage delay of the sensing circuit 124, analog-to-digital conversion stage delay of the analog-to-digital converter 122, currents reading and position reading difference delay in the data processor (264 or 664) as well as raw position advancement due to serial and parallel bus communication (e.g., the first data bus 602 and the second data bus 608 of FIG. 6, respectively):

$$\theta_{compensated} = \theta_{adjusted\_selected} - \frac{\text{latest spd\_rpm}}{60} \cdot 360° \cdot \text{pole\_pairs} \cdot T_d$$

where $\theta_{adjusted\_selected}$ is the selected position between the predicted position and adjusted position reading, the latest spd_rpm is the last detected speed by data processor 264, and pole_pairs is a number of pole pairs within the motor (e.g., 117), and Td is the total time delay.

Figure 5:
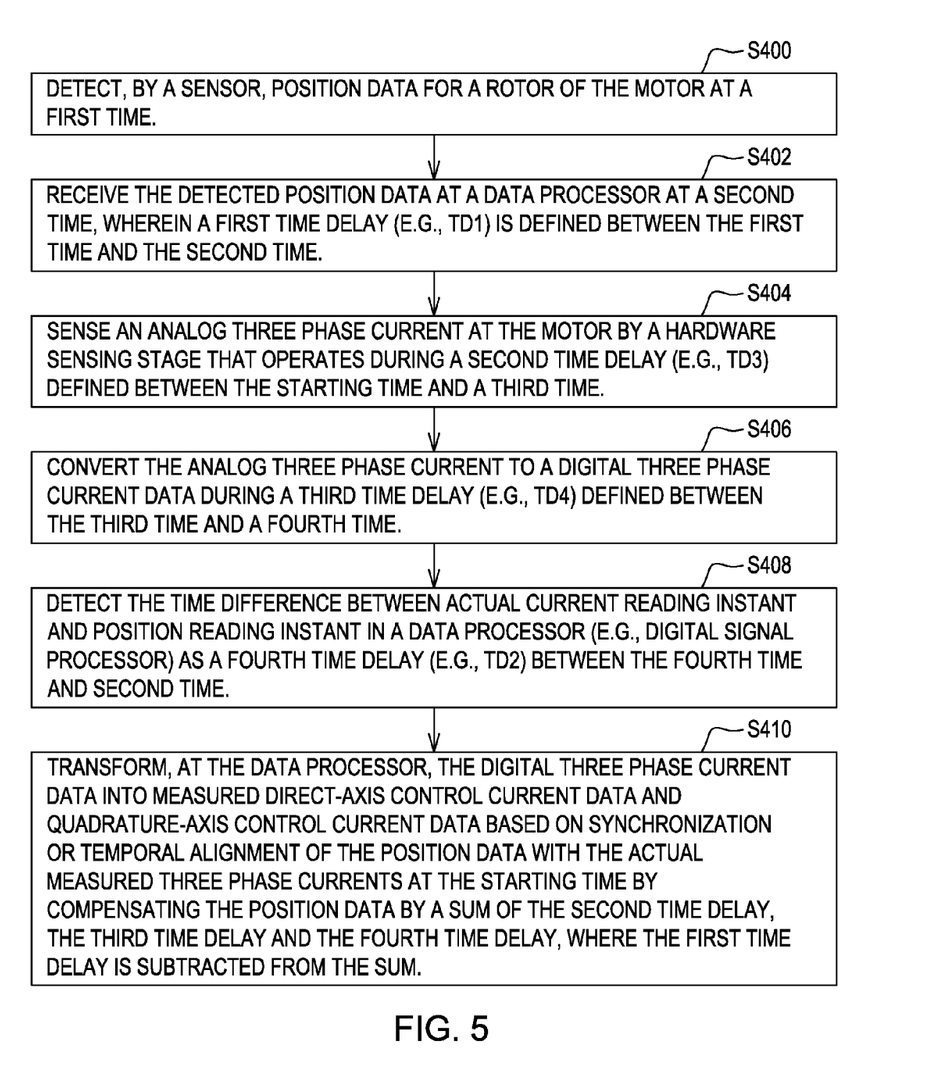
FIG. 5 is a flow chart of a second embodiment of a method for controlling an electrical motor with time compensation for position sensing.

FIG. 5 discloses a second embodiment of a method for controlling an electric motor, or determining a position of a rotor or motor shaft 126, with compensation for time delay. The method of FIG. 5 begins in step S400.

In step S400, a sensor 115 detects position data for a rotor of the motor 117 at a first time.

In step S402, a data processor 264 receives the detected position data at a second time, wherein a first time delay (e.g., Td1) is defined between the first time and the second time. At the first time the raw position was detected by the sensor 115 and at a second time the raw position was detected by the data processor 264 (e.g., digital signal processor (DSP) or the primary processing module 114) after transmission. In one embodiment, the receiving of the detected position data at a data processor 264 is communicated via a first data bus (602 in FIG. 6) from the sensor 115 to a field programmable gate array (FPGA) (e.g., 604 in FIG. 6) and a second data bus (608 in FIG. 6) from the field programmable gate array (e.g., 604) to a digital signal processor (DSP) (e.g., 606 in FIG. 6), the first data bus (602) comprising a serial data bus and the second bus (608) comprising a parallel bus.

In step S404, a sensing circuit 124 senses an analog phase current (e.g., analog three phase currents) at the motor by operating during a second time delay (e.g., Td3) defined between a starting time and a third time. The second time delay is the time delay associated with the hardware in the sensing circuit 124. The starting time is when the sensing circuit 124 actually begins to sense the analog phase current (e.g., three phase currents) received from the sensor 115. The second time delay relates to the three phase currents after the hardware sensing delay in the sensing circuit 124 and terminates simultaneously with triggering of the analog-to digital conversion. In one example, the sensing circuit 124 senses the three phase actual currents that comprise first sensing by a current transducer (e.g., 701 in FIG. 7) and then adjusting the output of the current transducer by an amplifier (e.g., an operational amplifier) (e.g., 703 in FIG. 7).

In one embodiment, the second time delay (e.g., Td3) in the hardware sensing stage is determined by the following equation:

$$T_{d3} = \frac{\Phi_{tot}(f_e)}{360°} \cdot \frac{1}{f_e},$$

where $f_e$ is the electrical frequency corresponding to a specific motor speed and $\phi_{tot}$ is the total phase delay caused by the sensing circuit 124.

In step S406, an analog-to-digital converter 122 converts the analog current (e.g., analog three phase current) to a digital current (e.g., digital three phase current data) during a third time delay (e.g., Td4) defined between the third time and a fourth time. The third time delay relates to a time delay between the third time and the fourth time. At the third time the actual three phase analog currents begin conversion to digital three phase currents. The analog-to-digital conversion process experience delays from one or more of the following: digital sampling and hold, a sampling-hold delay, storage of data in data registers, storage of data in sampling and hold registers, storing data in peripheral analog-to-digital registers, and transferring data between registers. Further, the analog to digital process may involve further delay in reading the three phase digital currents by the data processor 264 from peripheral registers of an analog-to-digital converter 122. At the fourth time the analog-to-digital conversion is completed.

In step S408, a secondary processing module 116 or the data processor 264 detects the time difference between actual current reading instant and position reading instant in a data processor 264 (e.g., digital signal processor (DSP)) as a fourth time delay (e.g., Td2) between the fourth time and first time. The fourth time delay represents a time between the first time and the fourth time.

In an alternative embodiment, the fourth time delay may be defined as the difference between a current reading instant of respective raw position data detection by the sensor 115 and the current reading instant of corresponding analog phase current data in the data processor 264 (e.g., digital signal processor).

In another alternative embodiment, the fourth time delay may take into account the time delay or time difference associated with the digital signal processing of phase current data within the secondary processing module 116 and transmission time through a data port (e.g., fourth data port 274) to the secondary processing module 116 or data processor 264, for example. Further, the secondary processing module's or the data processor's detection of the time difference may involve further delay in reading the three phase digital currents by the data processor 264 from peripheral registers of an analog-to-digital converter 122.

In step S410, the phase converter 113 or the data processor 264 transforms the digital current data (e.g., three phase current data) into measured direct-axis control current data and quadrature-axis control current data based on synchronization or temporal alignment of the position data with the actual measured three phase currents at the starting time by compensating the position data by a sum of the second time delay, the third time delay and the fourth time delay, where the first time delay is subtracted from the sum. For example, the data processor 264 provides respective position data of the rotor from the primary processing module 114 that is synchronized with the corresponding current phase data (e.g., $i_a$, $i_b$, and $i_c$) from the secondary processing module 116 for temporally aligned input to the phase converter 113 (e.g., for Park transformation) because of the compensation (e.g., the offset provided by the first time delay, subtracted from the above sum).

Step S410 may be carried out in accordance with various techniques that may be applied alternately or cumulatively. Under a first technique, the phase converter 113 or data processor (e.g., 264 or 664) transforms or converts three-phase current readings into actual direct and quadrature-axes current data by establishing an adjusted direct-quadrature axes for the motor by the data processor 264, where the adjustment relates to the applying the temporal alignment to a raw direct-quadrature axes determined by the raw position sensor 115 reading. Under a second technique, the phase converter 113 or the data processor (e.g., 264 or 664) transforms or converts three-phase current readings into actual dq-axis currents by adjusting the transformation angle or rotor position angle, defined from a phase-A magnetic axis to the positive direct axis. Under a third technique, the phase converter 112 or the data processor (e.g., 264 or 664) transforms by converting three-phase detected currents readings into actual direct and quadrature axes current data using actual position data of the rotor, which may be advanced in time from the detected position data in the data processor 264 at the second time due to serial and parallel bus communication (e.g., the first data bus 602 and the second data bus 608 of FIG. 6, respectively).

In an alternative embodiment, after step S410, the data processor (264 or 664) may apply an additional compensation to the raw detected rotor position data reading in the data processor 264 consistent with the following equation to adjust the hardware sensing stage delay of the sensing circuit 124, analog-to-digital conversion stage delay of the analog-to-digital converter 122, currents reading and position reading difference delay in the data processor (264 or 664) as well as raw position advancement due to serial and parallel bus communication (e.g., the first data bus 602 and the second data bus 608 of FIG. 6, respectively):

$$\theta_{compensated} = \theta_{adjusted\_selected} - \frac{\text{latest\_spd\_rpm}}{60} \cdot 360° \cdot \text{pole\_pairs} \cdot T_d$$

where $\theta_{adjusted\_selected}$ is the selected position between the predicted position and adjusted position reading, the latest spd_rpm is the last detected speed by data processor 264, and pole_pairs is a number of pole pairs within the motor, and Td is the total time delay.

Figure 6:
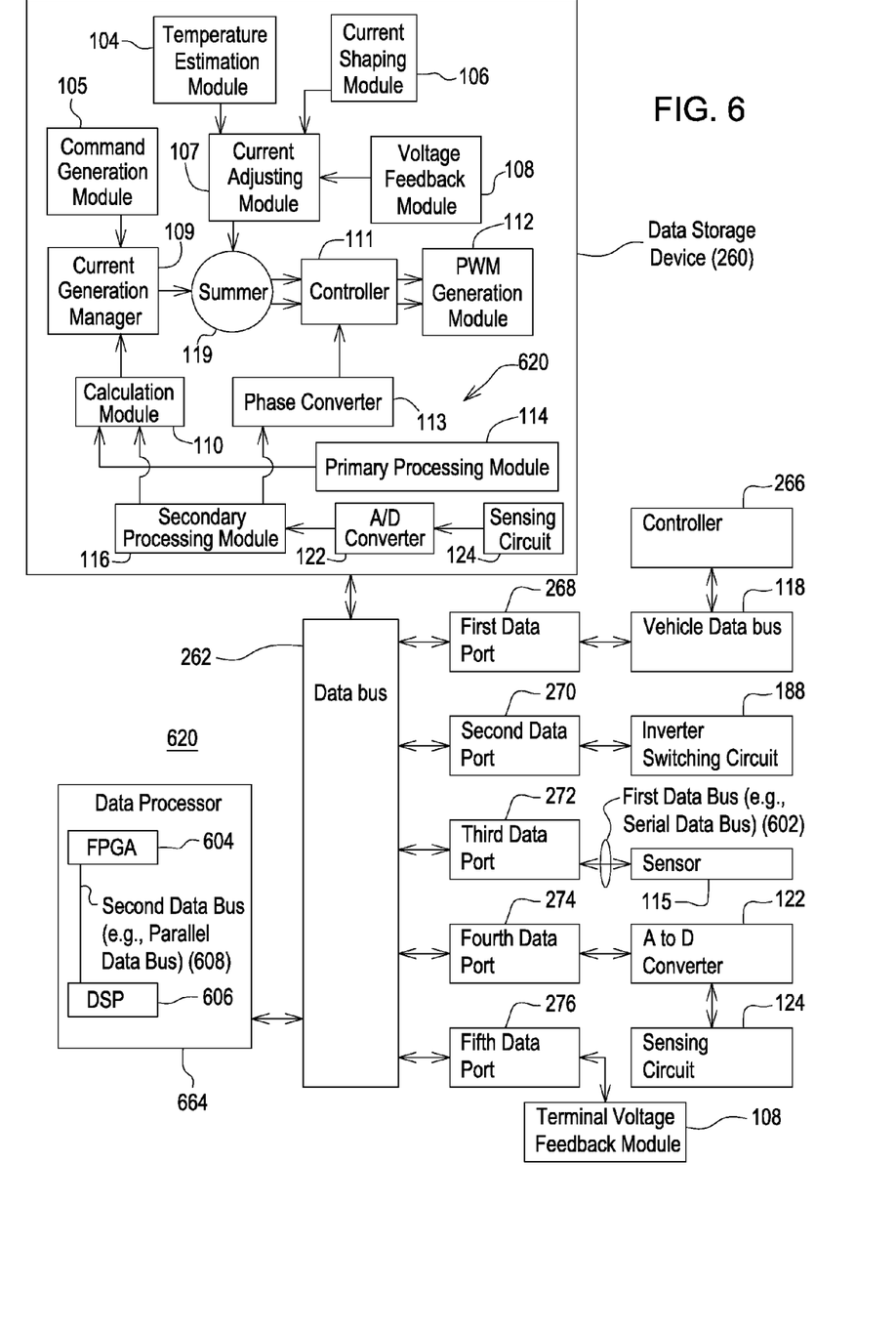
FIG. 6 is a block diagram of another embodiment of an electronic data processing system consistent with FIG. 1.

The data processing system 620 of FIG. 6 is similar to the data processing system 120 of FIG. 1, except the data processing system 620 of FIG. 6 features data processor 664 and the first data bus 602. Like reference numbers in FIG. 1 and FIG. 6 indicate like elements.

In the illustrative configuration of FIG. 6, the first data bus 602 provides a first communication path for measured position data (or speed data) between the sensor 115 and a data port (e.g., the third data port 272) of the data processing system 620. In turn, the data port or third data port 272 supports communications with the data processor 664 via the data bus 262. The data processor 664 comprises a field programmable gate array (FPGA) coupled to a digital signal processor (DSP) via a second data bus 608. The second data bus 608 provides a second communication path for measured position data (or speed data) of the sensor 115. In one embodiment, the first data bus 602 comprises a serial data bus, whereas the second data bus 608 may comprise a parallel data bus. Accordingly, if the first data bus 602 comprises a serial data bus, it tends to have a lower data throughput or maximum transmission rate in bits or bytes per second than the parallel data bus.

Figure 7:
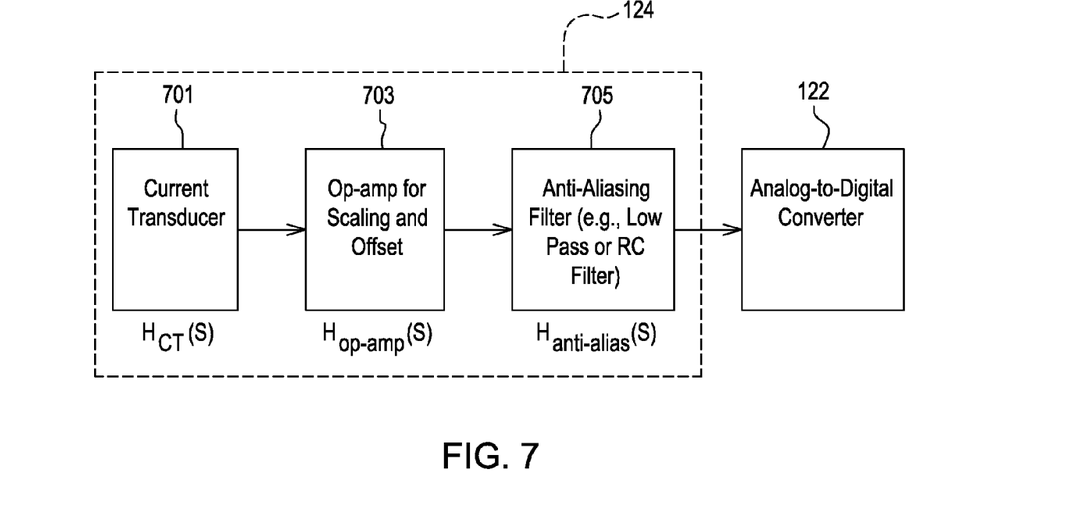
FIG. 7 is a block diagram of one possible configuration of the sensing circuit of FIG. 1 in greater detail.

FIG. 7 shows a block diagram of one possible configuration the sensing circuit 124 of FIG. 1, FIG. 2 and FIG. 6 in greater detail. In one embodiment, the sensing circuit 124 may comprise a current transducer 701 coupled to an amplifier 703 (e.g., an operational amplifier). In turn, the amplifier 703 is coupled to a filter 705 or anti-aliasing filter. The output of the filter 705 is capable of communicating with the inputs of the analog-to-digital converter 124.

The current transducer 701 has a transducer input and a transducer output, where the transducer output is coupled to the amplifier input of the amplifier 703.

The amplifier 703 may be used for scaling of voltages outputted by the current transducer 701 such that the voltages fall within a desired range (e.g., zero to three volts) for input to the analog-to-digital converter 124, or other digital logic circuitry. The amplifier 703 may also address any offset of the output voltages of the current transducer 701. In one embodiment, the amplifier 703 may comprise two successive or tandem stages of operational amplifiers, where an output of the first operational amplifier of the first stage feeds the input of a second operational amplifier of the second stage. If the sensing circuit 124 has two stages of amplification, each stage of amplification may add delay to the total delay or phase lag. The amplifier 703, or two stage operational amplifier configuration has an amplifier input and an amplifier output, where the amplifier output is coupled to a filter input of the filter 705.

The filter 705 may comprise a low pass filter or another anti-aliasing filter. In one configuration, the filter 705 comprises a resistive capacitive (RC) network filter. The filter has a filter input and a filter output.

The method and system disclosed herein is well-suited for controlling an electric motor with compensation for time delay. The method and system facilitates accurate control signals based on position data that is adjusted for delays by electronic data processing or measurement circuitry. In particular, the method and system facilitates the reduction or elimination of error caused by temporal misalignment of the measured position data and corresponding phase current data that is inputted to the phase converter for control and regulation of current by the current regulation controller; hence, ultimately control of the inverter switching circuit. The method and system supports the reduction of an error between the actual measured position of the rotor and the position intended to be used with phase currents for Park transformation. Accordingly, the control signals generated by the inverter may be more precisely matched, aligned or synchronized in time with the actual position of the rotor than otherwise possible, which results in efficient or accurate control of the motor.

Having described the preferred embodiment, it will become apparent that various modifications can be made without departing from the scope of the invention as defined in the accompanying claims.

The following is claimed:

1. A method for controlling a motor, the method comprising:
detecting, by a sensor, position data for a rotor of the motor at a first time;
receiving, by a data processor, the detected position data associated with a first time delay;
sensing, by a sensing circuit, an analog phase current at the motor by operating during a second time delay;
converting, by an analog-to-digital converter, the analog current to a digital current data during a third time delay;
detecting a fourth time delay between an actual current reading instant and a position reading instant in a data processor;
transforming the digital current data into measured direct and quadrature axes control current data based on synchronization or temporal alignment of the position data with the actual measured analog current at the starting time by compensating the position data by a sum of the second time delay, the third time delay and the fourth time delay, where the first time delay is subtracted from the sum, wherein the first time delay comprises a time period associated with transmission of a sensor signal from the sensor and receipt of the sensor signal at the data processor; the second time delay comprises a time period when the sensing circuit senses an analog control current at motor windings of the motor via the sensor signal; the third time delay comprises a time period associated with the analog-to-digital conversion and storage process in the analog-to-digital converter; and the fourth time delay comprises a time period or offset from a phase current reading to a position data reading and determination in the data processor.

2. The method according to claim 1 wherein the analog current comprises analog three phase current and wherein digital current data comprises digital three phase current.

3. The method according to claim 1 wherein the first time delay comprises a time period associated with transmission of a sensor signal from the sensor and receipt of the sensor signal at the data processor; the second time delay comprises a time period when the sensing circuit senses an analog control current at motor windings of the motor via the sensor signal; the third time delay comprises a time period associated with the analog-to-digital conversion and storage process in the analog-to-digital converter; and the fourth time delay comprises a time period or offset from a phase current reading to a position data reading and determination in the data processor.

4. The method according to claim 1 wherein the receiving of the detected position data at a data processor is communicated via a first data bus from the sensor to a field programmable gate array (FPGA) and a second data bus from the field programmable gate array to a digital signal processor (DSP), the first data bus comprising a serial data bus and the second bus comprising a parallel bus.

5. The method according to claim 1 wherein the transforming or converting of three-phase current readings into actual direct and quadrature-axes current data comprises establishing an adjusted direct-quadrature axes for the motor by the data processor, where the adjustment relates to the applying the temporal alignment to a raw direct-quadrature axes determined by the raw position sensor reading.

6. The method according to claim 1 wherein the transforming or converting of three-phase current readings into actual dq-axis currents comprises adjusting the transformation angle or rotor position angle, defined from phase-A magnetic axis to the positive direct axis.

7. The method according to claim 1 wherein the second time delay in the hardware sensing stage is determined by the following equation.

$$T_{d3} = \frac{\Phi_{tot}(f_e)}{360°} \cdot \frac{1}{f_e},$$

where $f_e$ is the electrical frequency corresponding to a specific motor speed and $\phi_{tot}$ is the total phase delay caused by the sensing circuit.

8. The method according to claim 1 wherein the transforming further comprises:
converting three-phase detected currents readings into actual direct and quadrature axes current data using actual position data of the rotor, which may be advanced in time from the detected position data in the data processor at the second time due to serial and parallel bus communication.

9. The method according to claim 1 further comprising:
applying, by the data processor, an additional compensation to the raw detected rotor position data reading in the data processor consistent with the following equation to adjust the hardware sensing stage delay, analog-to-digital conversion stage delay, currents reading and position reading difference delay in the data processor as well as raw position advancement due to serial and parallel bus communication:

$$\theta_{compensated} = \theta_{adjusted\_selected} - \frac{\text{latest spd\_rpm}}{60} \cdot 360° \cdot \text{pole\_pairs} \cdot T_d$$

where $\theta_{adjusted\_selected}$ is the selected position between the predicted position and adjusted position reading, the latest spd_rpm is the last detected speed by data processor, and pole_pairs is a number of pole pairs within the motor, and Td is the total time delay.

10. A method for controlling a motor, the method comprising:
detecting, by a sensor, position data for a rotor of the motor at a first time;
receiving the detected position data at a data processor at a second time, wherein a first time delay is defined between the first time and the second time;
sensing an analog three phase control current at the motor by a hardware sensing stage that operates during a second time delay defined between the starting time and a third time;
converting, by an analog-to-digital converter, the analog three phase current to a digital three phase current data during a third time delay defined between the third time and a fourth time;
detecting the time difference between actual current reading instant and position reading instant in the data processor as a fourth time delay between the fourth time and second time; and
transforming, at the data processor, the digital three phase current data into measured direct-axis control current data and quadrature-axis control current data based on synchronization or temporal alignment of the position data with the actual measured three phase currents at the starting time by compensating the position data by a sum of the second time delay, the third time delay and the fourth time delay, where the first time delay is subtracted from the sum, wherein the first time delay comprises a time period associated with transmission of a sensor signal from the sensor and receipt of the sensor signal at the data processor; the second time delay comprises a time period when the hardware sensing stage senses an analog control current at motor windings of the motor via the sensor signal; the third time delay comprises a time period associated with the analog-to-digital conversion and storage process in the analog-to-digital converter; and the fourth time delay comprises a time period or offset from a phase current reading to a position data reading and determination in the data processor.

11. The method according to claim 10 wherein the receiving of the detected position data at a data processor is communicated via a first data bus from the sensor to a field programmable gate array (FPGA) and a second data bus from the field programmable gate array to a digital signal processor (DSP), the first data bus comprising a serial data bus and the second bus comprising a parallel bus.

12. The method according to claim 10 wherein:
the sensing of the three phase actual currents further comprises first sensing by a current transducer and then adjusting the output of the current transducer by an amplifier;

the converting further comprises converting the analog values to digital values after sampling-hold delay; and the detecting the time difference further comprises reading the three phase digital currents which were read by the data processor from peripheral registers of the analog-to-digital converter.

13. The method according to claim 10 wherein the transforming or converting of three-phase current readings into actual direct and quadrature-axes current data comprises establishing an adjusted direct-quadrature axes for the motor by the data processor, where the adjustment relates to the applying the temporal alignment to a raw direct-quadrature axes determined by the raw position sensor reading.

14. The method according to claim 10 wherein the transforming or converting of three-phase current readings into actual dq-axis currents comprises adjusting the transformation angle or rotor position angle, defined from the positive direct axis to a phase-A magnetic axis.

15. The method according to claim 10 wherein the hardware sensing stage comprises:
a low pass filter having a filter output;
a two stage operational amplifier configuration with an amplifier input and an amplifier output, the amplifier output coupled to the filter input; and
a current transducer with a transducer input and a transducer output, the transducer output is coupled to the amplifier input.

16. The method according to claim 10 wherein the second time delay in the hardware sensing stage is determined by the following equation:

$$T_{d3} = \frac{\Phi_{tot}(f_e)}{360°} \cdot \frac{1}{f_e},$$

where $f_e$ is the electrical frequency corresponding to a specific motor speed and $\phi_{tot}$ is the total phase delay caused by the sensing circuit.

17. The method according to claim 10 wherein the transforming further comprises:
converting three-phase detected currents readings into actual direct and quadrature axes current data using actual position data of the rotor, which may be advanced in time from the detected position data in the data processor at the second time due to serial and parallel bus communication.

18. The method according to claim 10 further comprising:
applying, by the data processor, an additional compensation to the raw detected rotor position data reading in the data processor consistent with the following equation to adjust the hardware sensing stage delay, analog-to-digital conversion stage delay, currents reading and position reading difference delay in the data processor as well as raw position advancement due to serial and parallel bus communication:

$$\theta_{compensated} = \theta_{adjusted\_selected} - \frac{\text{latest spd\_rpm}}{60} \cdot 360° \cdot \text{pole\_pairs} \cdot T_d$$

where $\theta_{adjusted\_selected}$ is the selected position between the predicted position and adjusted position reading, the latest spd_rpm is the last detected speed by data processor, and pole_pairs is a number of pole pairs within the motor, and Td is the total time delay.

19. A system for controlling a motor, the system comprising:
a sensor for detecting position data for a rotor of the motor at a first time;
a data processor for receiving the detected position data associated with a first time delay;
a sensing circuit for sensing an analog phase current at the motor by operating during a second time delay;
an analog-to-digital converter for converting the analog current to a digital current data during a third time delay;
a data processor for detecting a fourth time delay between an actual current reading instant and a position reading instant in the data processor;
a phase converter for transforming the digital current data into measured direct and quadrature axes control current data based on synchronization or temporal alignment of the position data with the actual measured analog current at the starting time by the data processor's compensating the position data by a sum of the second time delay, the third time delay and the fourth time delay, where the first time delay is subtracted from the sum, wherein the first time delay comprises a time period associated with transmission of a sensor signal from the sensor and receipt of the sensor signal at the data processor; the second time delay comprises a time period when the sensing circuit senses an analog control current at motor windings of the motor via the sensor signal; the third time delay comprises a time period associated with the analog-to-digital conversion and storage process in the analog-to-digital converter; and the fourth time delay comprises a time period or offset from a phase current reading to a position data reading and determination in the data processor.

20. The system according to claim 19 wherein the analog current comprises analog three phase current and wherein digital current data comprises digital three phase current.

21. The system according to claim 19 wherein:
a first data bus for coupling the sensor to a data port capable of communication with the data processor;
the data processor comprising a field programmable gate array coupled to a digital signal processor via a second data bus; and
detected position data communicated via the first data bus from the sensor to the field programmable gate array and from the field programmable gate array to the digital signal processor (DSP).

22. The system according to claim 21 wherein the first data bus comprises a serial data bus and the second bus comprises a parallel bus.

* * * * *